Aug. 26, 1941.  J. P. BIEHN  2,254,137
AUTOMOBILE PROTECTIVE SCREEN
Filed Nov. 14, 1940
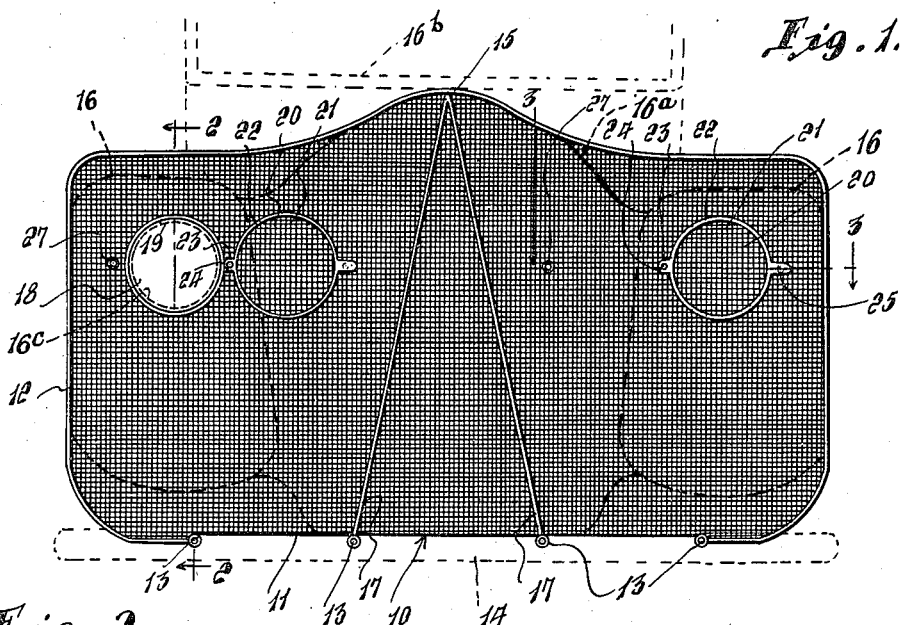
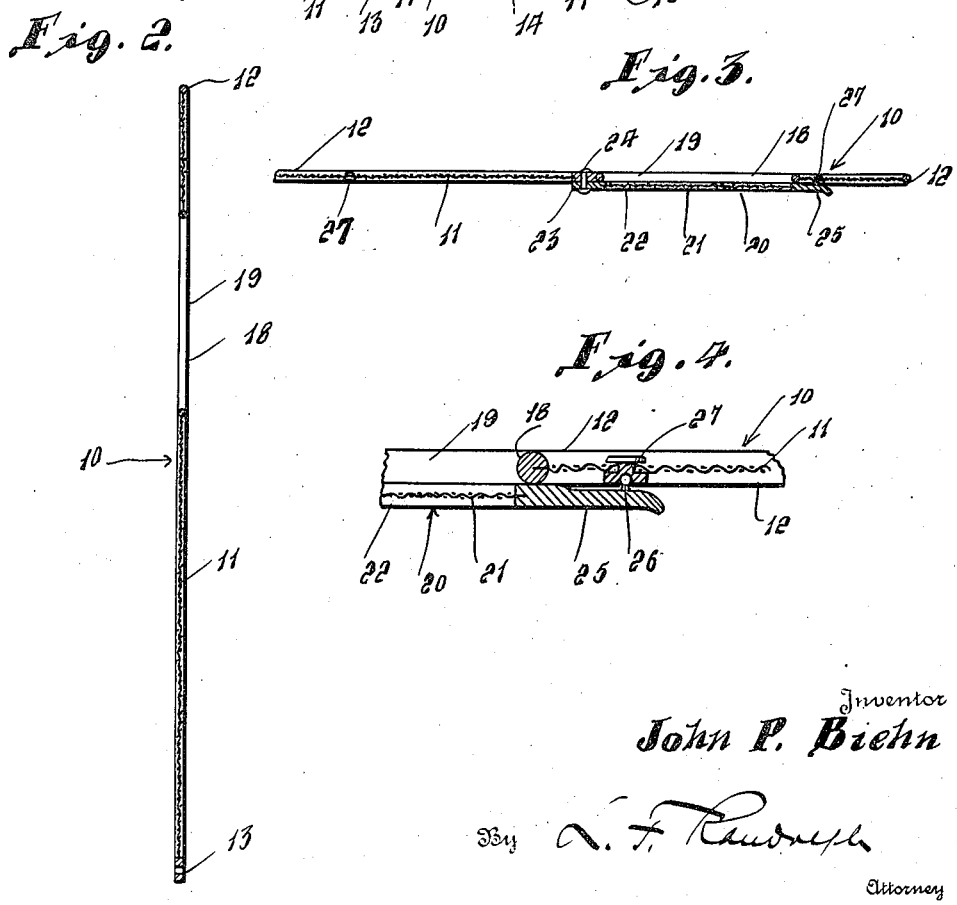
Inventor
John P. Biehn
By A. F. Randolph
Attorney Patented Aug. 26, 1941

2,254,137

UNITED STATES PATENT OFFICE 2,254,137

AUTOMOBILE PROTECTIVE SCREEN

John P. Biehn, Gregory, S. Dak.

Application November 14, 1940, Serial No. 365,716

5 Claims. (Cl. 293—54)

This invention relates to an improved construction of insect screen for the front of motor vehicles for protecting the front fenders and radiator from insects while the vehicle is in motion, and likewise the headlights whether they are disposed within the fenders or between the fenders and radiator.

More particularly, it is an aim of the invention to provide an insect shield of mesh wire fabric of simple construction which may be readily mounted on the front bumper of a motor vehicle and which may be provided with openings disposed in front of the headlights and adapted to be closed, when the headlights are not in use, by swingably mounted mesh wire fabric closures.

Other objects and advantages of the invention will hereinafter become more fully apparent from the following description of the drawing, which illustrates a preferred embodiment thereof, and wherein—

Figure 1 is a front elevational view showing the shield in an applied position on the front of a motor vehicle, a portion of which is shown in dotted lines, Figure 2 is a vertical sectional view taken substantially along the plane of the line 2—2 of Figure 1, Figure 3 is a horizontal sectional view taken substantially along the plane of the line 3—3 of Figure 1, and Figure 4 is a fragmentary sectional view on an enlarged scale, taken substantially along the same plane as Figure 3.

Referring more particularly to the drawing, wherein like reference characters designate like or corresponding parts throughout the different views, 10 designates generally the improved insect shield comprising the invention, and which is formed of a strip 11 of mesh wire fabric which is secured in a wire frame 12. The frame 12 is provided with spaced eyelets 13 in the lower portion thereof adapted to receive fastenings, not shown, for attaching the lower portion of the shield 10 to the front bumper of a motor vehicle which is shown in dotted lines at 14 in Figure 1. The shield 10 is of sufficient length to extend from side to side of the vehicle on which it is mounted and the end portions of the shield are of sufficient height to extend above the front fenders of the vehicle, which can be seen in dotted lines in Figure 1, at 16, and which are disposed behind the ends of the shield 10. The intermediate portion of the shield 10 is disposed in front of the radiator of the vehicle, seen in dotted lines at 16a in Figure 1, and is provided with an arcuately shaped upper portion 15 which extends above the level of the upper portions of the ends of the shield 10 and substantially to the level of the lower portion of the windshield, partially shown in dotted lines in Figure 1, at 16b. A pair of diagonal brace rods 17 extend from adjacent eyelets 13 upwardly in converging relationship to one another and join with one another at the apex of the portion 15 where said rods connect with the frame 12 for reinforcing the intermediate portion of the shield 10 to retain it in an upright position.

The shield 10 is provided with openings 18 formed in the mesh wire fabric 11 and disposed in front of the vehicle headlights, one of which is shown, in dotted lines at 16c in Figure 1, to provide for an unobstructed passage of the light rays from the headlights. The openings 18 are bound by the annular frames 19. Each of the openings 18 is equipped with a mesh wire fabric closure, designated generally 20, including a disk 21 of mesh wire fabric mounted in a ring shaped frame 22 which is provided with an outwardly projecting apertured lug 23 for receiving a pin 24 mounted in the frame 19. The lug 23 is turnably mounted on the pin 24 to mount the closure 20 so that it can swing in a vertical plane which is substantially parallel to the plane of the shield 10 from an open position, as seen at the left hand side of Figure 1, to a closed position, as seen at the right hand side thereof or conversely. Each of the frames 22 is also provided with a handle portion 25 which projects from the frame 22 in substantially diametrically opposed relationship to its lug 23 and which is provided adjacent its free end with an inwardly projecting male portion 26 of a snap fastening. The shield 10 adjacent each end thereof is provided with a pair of spaced female or socket portions 27 of a snap fastening one of each of which pairs is arranged to receive the portion 26 for holding a closure 20 in a closed position while the other of each of said pairs is arranged for receiving the same portion 26 for holding its closure 20 in an open position, both of which positions are illustrated in Figure 1. It will be obvious that in daylight driving when the headlights are not in use the closures 20 may be closed to protect the lenses from being soiled by contact with insects while the vehicle is in motion.

If desired, the openings 18 may be dispensed with and under such circumstances the closures 20 would be unnecessary and could be dispensed with.

From the foregoing it will be obvious that the shield 10 when applied, as illustrated in Figure 1, will protect the entire front portion of the motor vehicle on which it is mounted from being soiled by insects striking the front portion of the vehicle while it is in motion, and it is so constructed, arranged and mounted that it will not interfere or in any way impair the visibility of the operator of the vehicle. The shield 10 may be attached to or removed from the motor vehicle by applying or removing the four fastenings which engage the eyelets 13 and no other braces or supporting means are necessary to support and maintain the shield in position.

Various modifications and changes are contemplated and may obviously be resorted to as only a preferred embodiment of the invention has been disclosed.

I claim as my invention:

1. An insect shield for motor vehicles comprising a shield formed of mesh wire fabric mounted within a frame, said frame being provided with eyelets in its lower portion for receiving fastenings for attaching the shield to the front bumper of a motor vehicle, said shield extending from side to side of the vehicle and being disposed in front of the front fenders and the radiator, said mesh wire fabric being provided with openings disposed in front of the headlights of the vehicle, and mesh wire fabric closures swingably connected to the shield for closing or exposing said openings.

2. An insect shield for motor vehicles comprising a mesh wire fabric screen provided with a wire supporting frame, eyelets in the lower portion of said supporting frame for receiving fastenings for attaching the shield to the front bumper of a motor vehicle, the end portions of the shield being disposed in front of the front fenders of the vehicle, the upper edges of said end portions being at substantially the level of the uppermost portions of the front fenders, the intermediate portion of the shield being bowed upwardly at its top and disposed in front of the vehicle radiator, and said intermediate portion extending above the end portions of the shield for shielding the entire front of the radiator.

3. An insect shield as in claim 2, comprising upwardly converging brace members extending from certain of said eyelets and joining with said supporting frame at the apex of the shield.

4. An insect shield for motor vehicles comprising a mesh wire fabric screen provided with a wire supporting frame, eyelets in the lower portion of said supporting frame for receiving fastenings for attaching the shield to the front bumper of a motor vehicle, the end portions of the shield being disposed in front of the front fenders of the vehicle, the intermediate portion of the shield being disposed in front of the vehicle radiator, said intermediate portion extending above the end portions of the shield, the end portions of said shield being provided with openings disposed in front of the headlights of the vehicle, and swingably mounted closures of mesh wire fabric for closing or exposing said openings.

5. An insect shield as in claim 4, said mesh wire fabric closures each including a disk of mesh wire fabric, a ring shaped frame in which the disk is mounted, a lug projecting from said ring shaped frame and provided with an opening, a pin carried by the shield for engaging the opening of said lug for swingably mounting the closure, said ring shaped frame being provided with a lug in diametrically opposed relationship to said first mentioned lug, said last mentioned lug being provided with the male portion of a snap fastening, and said shield being provided with a pair of spaced female portions of a snap fastening for receiving said male portion for retaining the closure in an open or a closed position.

JOHN P. BIEHN.